United States Patent
Gonzales, Jr.

(10) Patent No.: US 9,961,086 B2
(45) Date of Patent: May 1, 2018

(54) DYNAMIC CONTENT AUTHENTICATION FOR SECURE MERCHANT-CUSTOMER COMMUNICATIONS

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 230 days.

(21) Appl. No.: 14/973,903

(22) Filed: Dec. 18, 2015

(65) Prior Publication Data

US 2017/0180385 A1   Jun. 22, 2017

(51) Int. Cl.
*H04L 29/06* (2006.01)
*G06Q 30/06* (2012.01)

(52) U.S. Cl.
CPC ....... *H04L 63/102* (2013.01); *G06Q 30/0601* (2013.01); *H04L 63/08* (2013.01); *H04L 63/123* (2013.01)

(58) Field of Classification Search
CPC  G06C 30/06; G06C 30/0601; G06C 30/0609; H04L 63/08; H04L 63/102; H04L 63/123; H04L 63/1483
See application file for complete search history.

(56) References Cited

U.S. PATENT DOCUMENTS

| | | |
|---|---|---|
| 5,799,082 A | 8/1998 | Murphy |
| 6,269,446 B1 | 7/2001 | Schumacher et al. |
| 7,991,388 B1 | 8/2011 | Becker et al. |
| 2009/0077637 A1* | 3/2009 | Santos ............... H04L 63/126 726/5 |
| 2010/0306819 A1* | 12/2010 | Nahari ............... G06F 21/554 726/2 |
| 2011/0277024 A1* | 11/2011 | Begley ............... H04L 63/08 726/7 |
| 2012/0143761 A1* | 6/2012 | Doran ............... G06Q 20/40 705/44 |
| 2013/0054335 A1* | 2/2013 | Kjelsbak ............. G06F 3/017 705/14.26 |
| 2013/0080331 A1* | 3/2013 | Granbery .......... G06Q 20/3829 705/71 |
| 2014/0129292 A1* | 5/2014 | Ruvini ............. G06Q 30/0241 705/7.34 |

(Continued)

FOREIGN PATENT DOCUMENTS

JP    2003284141 A    10/2003
WO   WO-2008064403 A1   6/2008

*Primary Examiner* — Khang Do
(74) *Attorney, Agent, or Firm* — Schwegman Lundberg & Woessner, P.A.

(57) ABSTRACT

According to various embodiments, the Message Authentication Engine is given permission to access dynamically changing content provided by a buyer system. The Message Authentication Engine receives a purchase request from the buyer system for an item from a vendor system. Based on the purchase request, the Message Authentication Engine retrieves a portion of the dynamically changing content from a client device of the buyer system. The Message Authentication Engine provides to the vendor system the portion of the dynamically changing content provided by the buyer system. The vendor system sends a message to the buyer system with a copy of the portion of the dynamically changing content as a visual verification that the vendor system can be trusted.

17 Claims, 6 Drawing Sheets

(56) References Cited

U.S. PATENT DOCUMENTS

| | | | | |
|---|---|---|---|---|
| 2014/0149308 A1* | 5/2014 | Ming | .................. | G06Q 10/0833 705/333 |
| 2014/0189808 A1* | 7/2014 | Mahaffey | .............. | H04L 63/083 726/4 |
| 2015/0310486 A1* | 10/2015 | Hayes | ................ | G06Q 30/0252 705/14.5 |

* cited by examiner

DYNAMIC CONTENT AUTHENTICATION FOR SECURE MERCHANT-CUSTOMER COMMUNICATIONS

TECHNICAL FIELD

The present application relates generally to the technical field of providing authentication of communications involved in a transaction.

BACKGROUND

Typical electronic commerce ("e-commerce) sites provide users (e.g., sellers) with computer-implemented services for selling goods or services through, for example, a website. For example, a seller may submit information regarding a good or service to the e-commerce site through a web-based interface. Upon receiving the information regarding the good or service, the e-commerce site may store the information as a listing that offers the good or service for sale. Other users (e.g., buyers) may interface with the e-commerce site through a search interface to find goods or services to purchase. For example, some typical e-commerce sites may allow the user to submit a search query that includes, for example, search terms that may be matched by the e-commerce site against the listings created by the sellers.

BRIEF DESCRIPTION OF THE DRAWINGS

The present invention is illustrated by way of example, and not by way of limitation, in the figures of the accompanying drawings in which.

DETAILED DESCRIPTION

Figure 1:
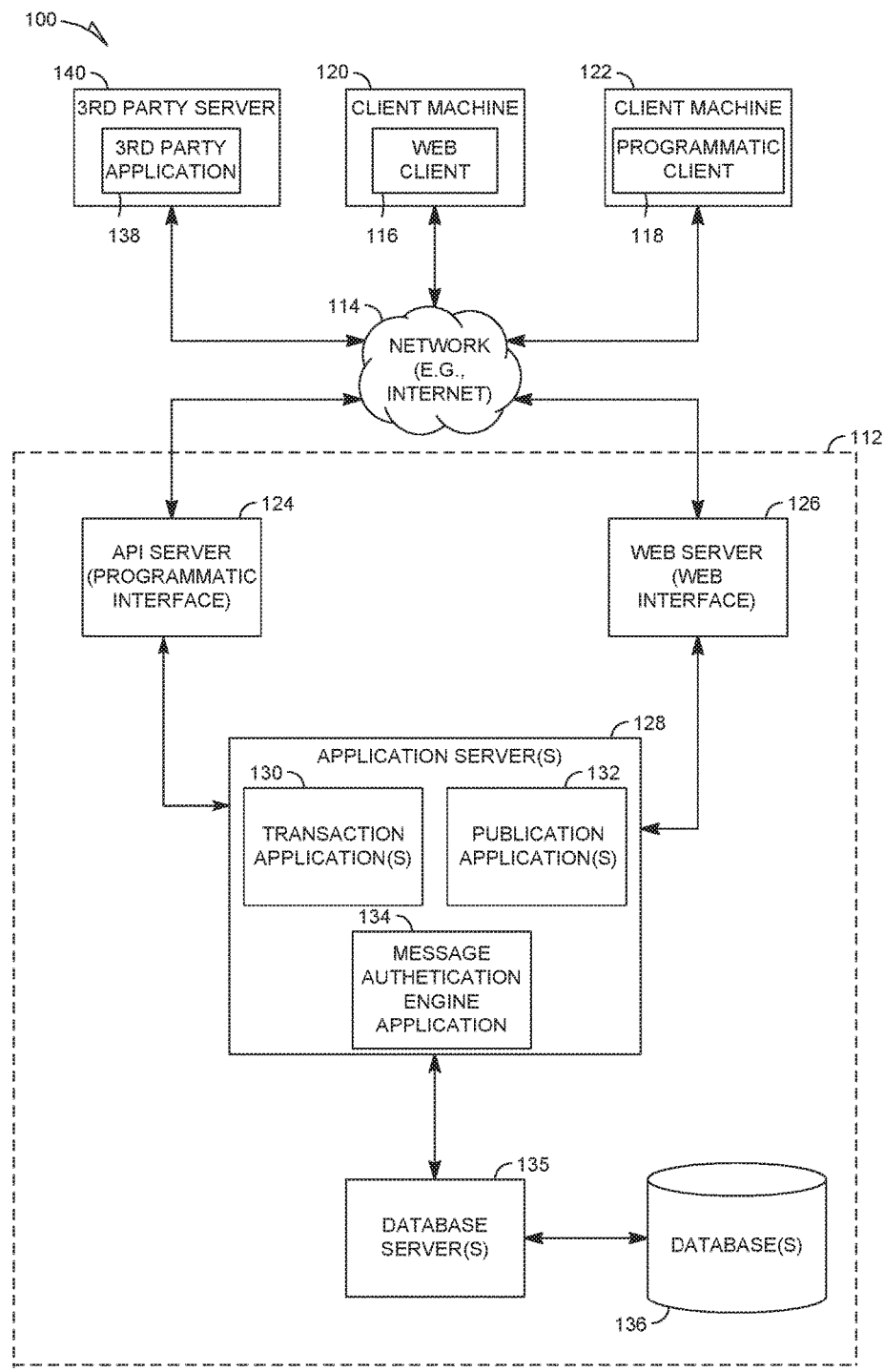
FIG. 1 is a network diagram depicting a publication system, according to one embodiment, having a client-server architecture configured for exchanging data over a network.

Example methods and systems directed to a Message Authentication Engine are described. In the following description, for purposes of explanation, numerous specific details are set forth in order to provide a thorough understanding of example embodiments. It will be evident, however, to one skilled in the art that the present invention may be practiced without these specific details.

According to various embodiments, the Message Authentication Engine receives permission to access dynamically changing content provided by a buyer system. The Message Authentication Engine receives a purchase request from the buyer system for an item from a vendor system. Based on the purchase request, the Message Authentication Engine retrieves a portion of the dynamically changing content from a client device of the buyer system. The Message Authentication Engine provides to the vendor system the portion of the dynamically changing content provided by the buyer system. The vendor system sends a message to the buyer system with a copy of the portion of the dynamically changing content as a visual verification that the vendor system can be trusted.

In one embodiment, the Message Authentication Engine receives permission for future (or continual) access of a photo stream on a client device of the buyer system. The buyer system further specifies that the Message Authentication Engine only has access to, for example, the 10 most recent photos in the photo stream at a given time the publisher system attempts to access the photo stream. After providing the permission to the Message Authentication Engine, the buyer system later initiates a transaction with a vendor system through a website of a publisher system that includes the Message Authentication Engine. Based on the initiated transaction, the Message Authentication Engine accesses the photo stream and selects a particular photo from the 10 most recent photos in the photo stream. It is understood that at least a portion of the 10 most recent photos accessed by the Message Authentication Engine were created after the buyer system provided the permission to the Message Authentication Engine.

The Message Authentication Engine sends the particular photo to the vendor system. The vendor system sends a message to the buyer system regarding the transaction, wherein the message includes a copy of the particular photo. Presence of the particular photo in the message sent by the vendor system acts as a verification of the trustworthiness of the vendor system and an indication of the provenance of the message.

It is understood that various embodiments include the generation of a module(s) to cause a computing device(s) to perform any and/or all of the actions described herein. Once the module(s) is generated, the module(s) is sent for installation on the computing device(s). In one embodiment, the generated modules comprise source code that, when compiled by a computing device(s), creates object code that causes the computing device(s) to perform any or all of the various actions, steps, methods, and/or operations described herein. In other embodiments, the generated modules comprise object code that causes the computing device(s) to perform various actions, steps, methods, and/or operations described herein.

Platform Architecture

FIG. 1 is a network diagram depicting a translation system, according to one embodiment, having a client-server architecture configured for exchanging data over a network. The publication system 100 may be a transaction system where clients, through client machines 120, 122 and a third party server 140, may communicate, view, search, and exchange data with network based publisher 112. For example, the publication system 100 may include various applications for interfacing with client machines and client applications that may be used by users (e.g., buyers and sellers) of the system to publish items for sale in addition to facilitating the purchase and shipment of items and searching for items.

The network based publisher 112 may provide server-side functionality, via a network 114 (e.g., the Internet) to one or more clients. The one or more clients may include users that utilize the network based publisher 112 as a transaction intermediary to facilitate the exchange of data over the network 114 corresponding to user transactions. User transactions may include receiving and processing item and item related data and user data from a multitude of users, such as payment data, shipping data, item review data, feedback data, etc. A transaction intermediary such as the network-based publisher 112 may include one or all of the functions associated with a shipping service broker, payment service and other functions associated with transactions between one or more parties. For simplicity, these functions are discussed as being an integral part of the network based publisher 112, however it is to be appreciated that these functions may be provided by publication systems remotely and/or decoupled from the network based publisher 112.

In various embodiments, the data exchanges within the publication system 100 may be dependent upon user selected functions available through one or more client/user interfaces (UIs). The UIs may be associated with a client machine, such as the client machine 120, utilizing a web client 116. The web client 116 may be in communication with the network based publisher 112 via a web server 126. The UIs may also be associated with a client machine 122 utilizing a client application 118, or a third party server 140 hosting a third party application 138. It can be appreciated in various embodiments the client machine 120, 122 may be associated with a buyer, a seller, payment service provider or shipping service provider, each in communication with the network based publisher 112 and optionally each other. The buyers and sellers may be any one of individuals, merchants, etc.

An application program interface (API) server 124 and a web server 126 provide programmatic and web interfaces to one or more application servers 128. The application servers 128 may host one or more other applications, such as transaction applications 130, publication applications 132 and a Message Authentication Engine application 134. The application servers 128 may be coupled to one or more data servers that facilitate access to one or more storage devices, such as the data storage 136.

The transaction applications 130 may provide a number of payment processing modules to facilitate processing payment information associated with a buyer purchasing an item from a seller. The publication applications 132 may include various modules to provide a number of publication functions and services to users that access the network based publisher 112. For example, these services may include, inter alia, formatting and delivering search results to a client. The Message Authentication Engine application 134, may include various modules to access a portion of dynamically-changing content of a first account and provide it to a second account. The second account includes the portion of dynamically-changing content in a message to the first account, thereby providing an indication of trustworthiness of the message and the second account.

FIG. 1 also illustrates an example embodiment of a third party application 138, which may operate on a third party server 140 and have programmatic access to the network based publisher 112 via the programmatic interface provided by the API server 124. For example, the third party application 138 may utilize various types of data communicated with the network based publisher 112 and support one or more features or functions normally performed at the network based publisher 112. For example, the third party application 138 may receive a copy of all or a portion of the data storage 136 that includes buyer shipping data and act as the transaction intermediary between the buyer and seller with respect to functions such as shipping and payment functions. Additionally, in another embodiment, similar to the network-based publisher 112, the third party application 138 may also include modules to perform operations pertaining to payment, shipping, etc. In yet another embodiment, the third party server 140 may collaborate with the network based publisher 112 to facilitate transactions between buyers and sellers, such as by sharing data and functionality pertaining to payment and shipping, etc.

Figure 2:
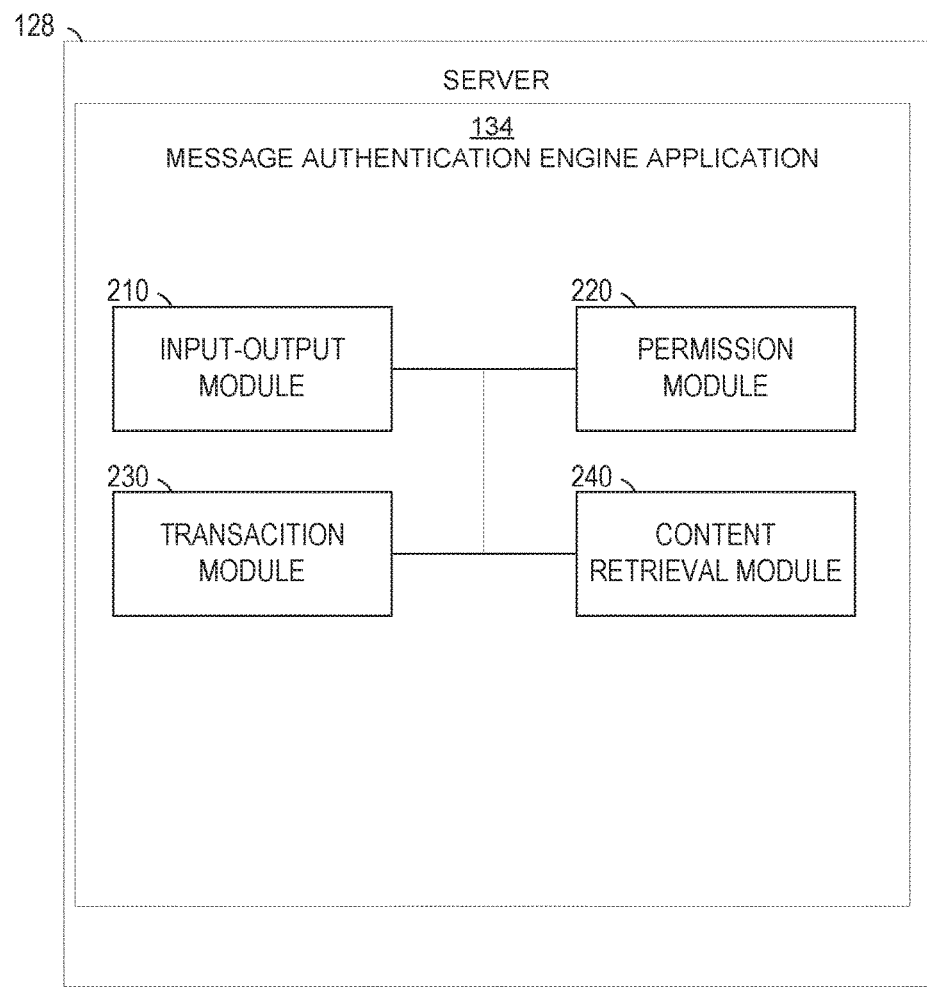
FIG. 2 is a block diagram illustrating components of a Message Authentication Engine, according to some example embodiments.

FIG. 2 is a block diagram illustrating components of a Message Authentication Engine 134, according to some example embodiments. The components communicate with each other to perform the operations of the Message Authentication Engine 134. The Message Authentication Engine manager 134 is shown as including an input-output module 210, a permission module 220, a transaction module 230 and a content retrieval module 240, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input-output module 210 is a hardware-implemented module which manages, controls, stores, and accesses information regarding inputs and outputs. An input can be a request for a transaction received from a first account (or a buyer party). An input can also be permission received from the first account for future access of dynamically-changing content. An output can be a transaction identifier sent to a second account (or a vendor party). An output can also be a portion of dynamically-changing content. An input can be a transaction message received from the second account. An output can be the transaction message forwarded to the first account.

The permission module 220 is a hardware-implemented module which manages, controls, stores, and accesses information regarding receiving permission for future access of dynamically-changing content accessible at a client device that corresponds to a first account in a publisher system (or accessible from a buyer system). The permission can include a recency criteria that allows only for access of dynamically-changing content created during a certain period time, such as within the last month, during the current day, or within the past week.

The transaction module 230 is a hardware-implemented module which manages, controls, stores, and accesses information regarding a transaction requested by a first account. The transaction module 230 generates transaction data related to a transaction identifier, an item, an item price, shipping information, payment information, etc.

The content retrieval module 240 is a hardware-implemented module which manages, controls, stores, and accesses information regarding accessing and retrieving, from a client device that corresponds to a first account in a publisher system (or a buyer system), a portion of dynamically-changing content that meets the recency criteria specified by the permission received from the first account. The content retrieval module 240 forwards the portion of dynamically-changing content to a second account in the publisher system (or a vendor system)

Figure 3:
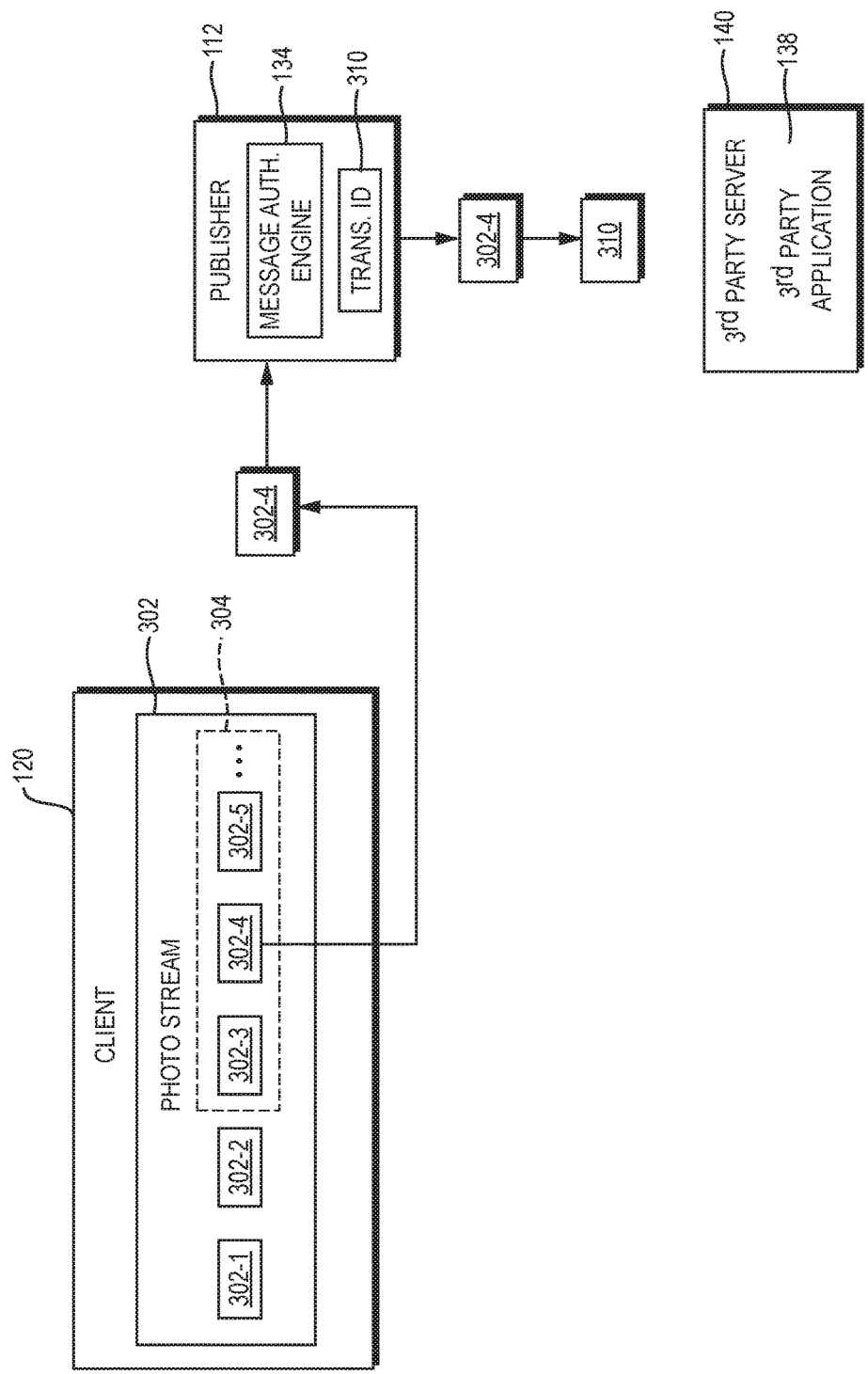
FIG. 3 is a block diagram illustrating a Message Authentication Engine providing a portion of dynamically-changing content to a vendor party, according to some example embodiments.

FIG. 3 is a block diagram illustrating a Message Authentication Engine 134 providing a portion 302-4 of dynamically-changing content to a vendor party, according to some example embodiments.

A client machine 120 corresponds to a buyer party and has provided the publisher system 112 with permission for future access of dynamically-changing content, such as a photo stream 302 that is constantly updated with new photos 302-1, 302-2., 302-2, 302-4, 302-5 . . . . The photo stream 302 resides on the client machine 120. The permission provided by the buyer party includes a recency window 304, which indicates the publisher may only access photos created during a time range (such as photos created during the last week or past 48 hours).

The publisher system 112 receives a request from the buyer party for a transaction to purchase an item from a vendor party that corresponds with a third party application 138 accessed via third party server 140. The publisher system 112 creates a transaction identifier 310 for the transaction. Based on the buyer party's request, the publisher system 112 accesses the photo stream 302 and selects a photo 302-4 that is included in the recency window 304. The publisher system 112 retrieves the photo 302-4 from the client device 120. The publisher system 112 sends the transaction identifier 310 and the photo 302-4 to the vendor party.

Figure 4:
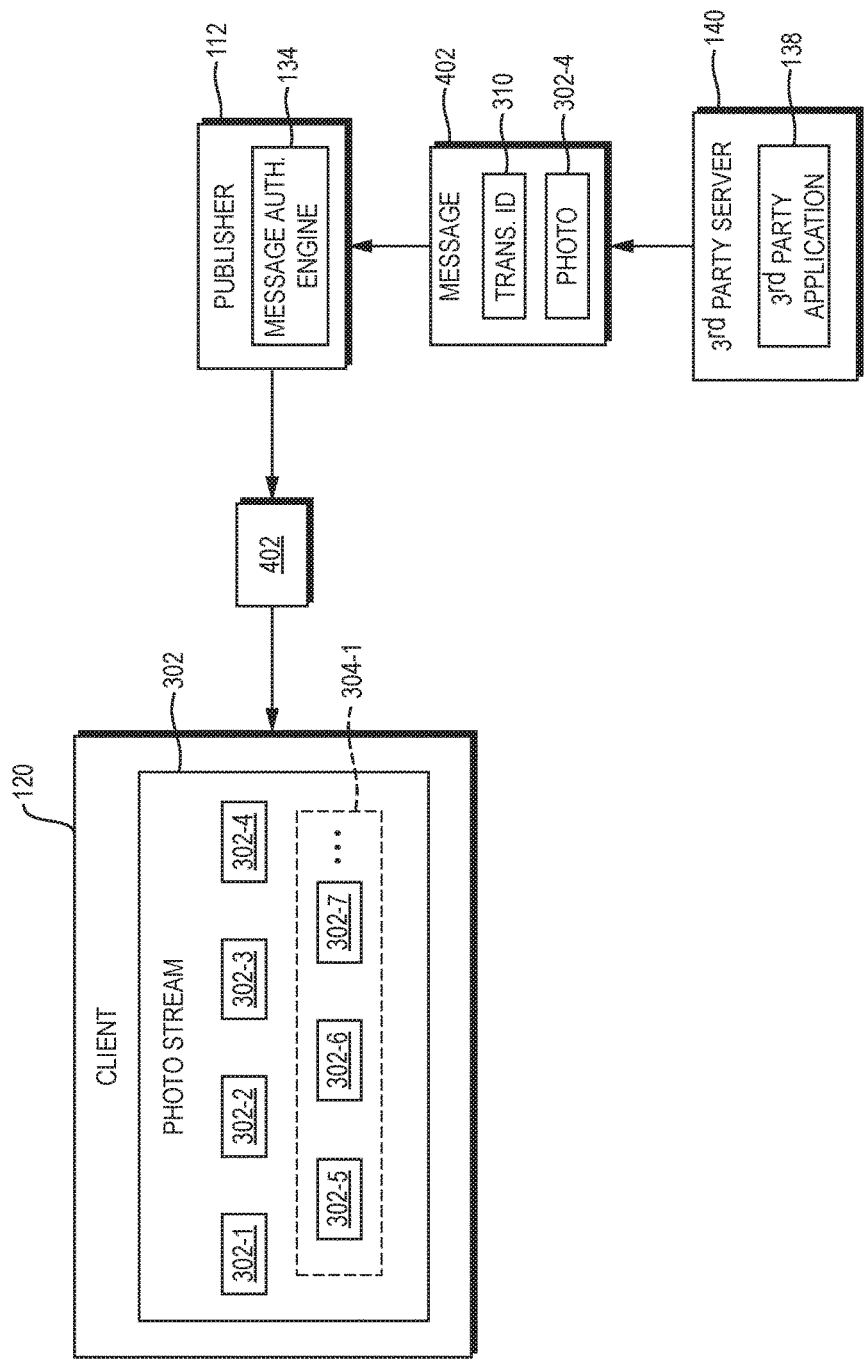
FIG. 4 is a block diagram illustrating a Message Authentication Engine providing a transaction message to a buyer party that includes the portion of dynamically-changing content, according to some example embodiments.

FIG. 4 is a block diagram illustrating a Message Authentication Engine 134 providing a transaction message 402 to a buyer party that includes the portion 302-4 of dynamically-changing content, according to some example embodiments.

The vendor party receives the transaction identifier 310 and the photo 302-4 from the publisher system 112. The vendor party, via the third party application 138, generates a transaction message 402 related to the transaction requested by the buyer party. The transaction message 402 includes the transaction identifier 310 and the photo 302-4. The vendor party sends the transaction message 402 to the publisher system 112 via the third party server 140. The publisher system 112 receives the transaction message 402 and forwards the transaction message 402 to the client machine 120, which includes an updated photo stream. That is, since the request for the transaction, new photos 302-5, 302-6, 302-7 have been created and stored in the photo stream. The new photos 302-5, 302-6, 302-7 are currently within the recency window 304-1 for the updated photo stream 302.

When the buyer party access the transaction message 402, the photo 302-4 will be viewable as part of the body of the transaction message 402 or as an attachment to the transaction message 402. The buyer party will recognize the photo 302-4 as a recent photo from the photo stream 302 to which the buyer party provided the publisher system 112 access. Such recognition will assist the buyer party in trusting the provenance of the transaction message 402 and to verify that continuing the transaction with the second account has little risk of a fraudulent result.

Figure 5:
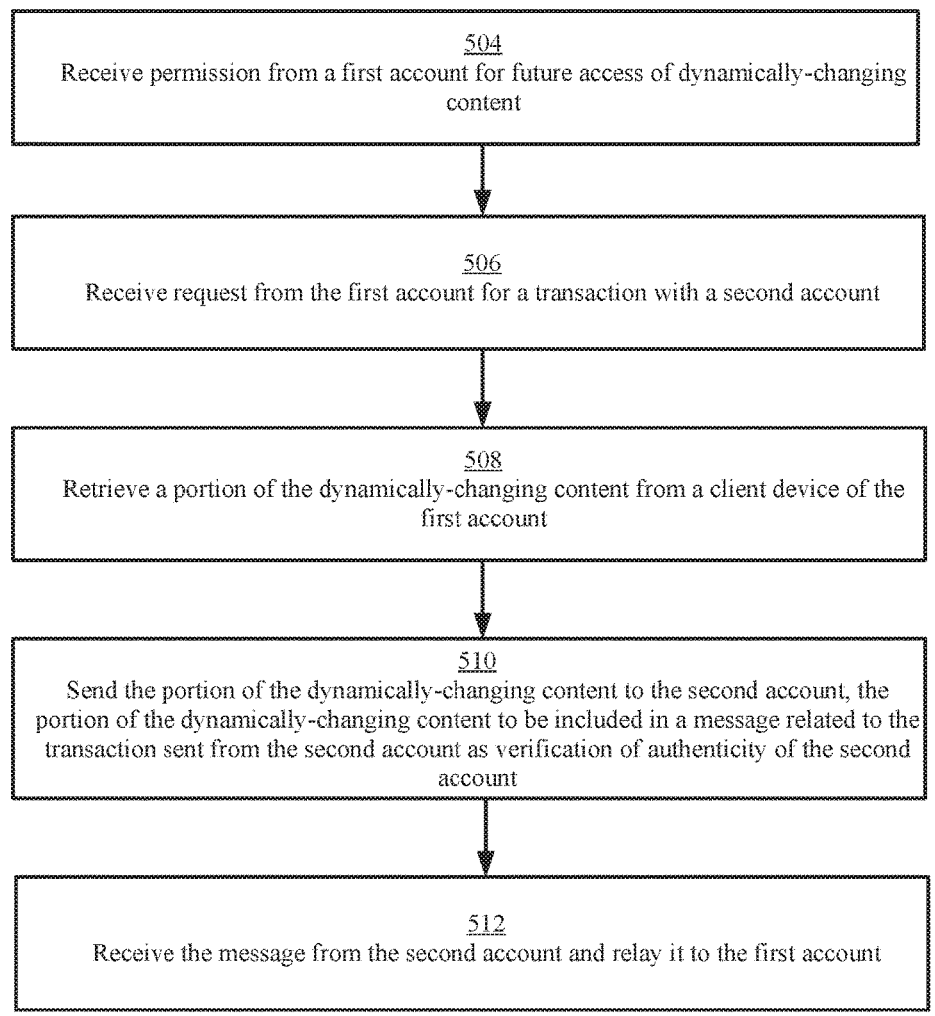
FIG. 5 is a flow diagram illustrating an example of method operations involved in a method of authenticating a message based on dynamically-changing content, according to some example embodiments.

FIG. 5 is a flow diagram illustrating an example of method 500 operations involved in a method of authenticating a message based on dynamically-changing content, according to some example embodiments.

At operation 504, the Message Authentication Engine 134 receives permission from a first account for future access of dynamically-changing content.

It is understood that the dynamically-changing content can be content that changes at any given time after the permission for future access has been provided to the Message Authentication Engine 134. The dynamically-changing content can be a client device's 120 location data (such as global positioning system [GPS] data). The permission for future access of the location data includes various eligibility criteria as to which location data the Message Authentication Engine 134 is allowed to access.

The eligibility criteria can include a distance threshold that specifies the Message Authentication Engine 134 has permission to access location data outside of a given distance range. For example, if the client device 120 is regularly situated in the San Francesco Bay area, the distance threshold may specify access to location data of the client device 120 that includes one or more locations at least 50 miles outside of the San Francisco Bay area. As such, if the owner of the client device 120 traveled to Los Angeles after giving permission to the Message Authentication Engine 134, the Los Angeles location data can be accessed by the Message Authentication Engine 134.

At operation 506, the Message Authentication Engine 134 receives a request from the first account for a transaction with a second account. The first account accesses a publisher system 112, which lists one or more items for purchase from various third party accounts. The Message Authentication Engine 134 is included as one or more modules within the publisher system 112. The request from the first account is a transaction request to purchase or place an auction bid for a particular item listed on the publisher system 112.

At operation 508, the Message Authentication Engine 134 retrieves a portion of the dynamically-changing content from a client device of the first account. The Message Authentication Engine 134 accesses the location data of the client device 120 and applies the eligibility criteria in order to retrieve the Los Angeles location data from the client device 120.

At operation 510, the Message Authentication Engine 134 sends the portion of the dynamically-changing content to the second account. The second account is a third party account that has placed the listing of the particular item on the publisher system 112. Los Angeles location data is to be included in a message related to the particular item sent from the second account. Presence of the Los Angeles location data in the message acts as a verification of authenticity of the second account. In one embodiment, the Los Angeles location data in the message can be a portion of a graphical representation of a map of Los Angeles. In another embodiment, the Los Angeles location data in the message can be an image of Los Angeles. Substituting representations for actual location information can help preserve user privacy since the third party cannot tell whether the image represents a location of the purchaser or simply a photo the purchaser possesses.

That is, when the end-user of the client device 120 accesses the message and views the Los Angeles location data in the message the end-user will remember that the end-user recently traveled to the Los Angeles area and that the Los Angeles location data satisfies the eligibility criteria sent to the Message Authentication Engine 134. Based on the end-user's personal knowledge of their travels and the eligibility criteria, the end-user will know that the Los Angeles location data was properly retrieved from the client device 120 by the Message Authentication Engine 134 and, therefore, that the message from the second account is authentic and can be trusted.

At operation 512, the Message Authentication Engine 134 receives the message from the second account and relays the message to the first account. In another embodiment, the second account sends the message directly to the first account, bypassing the Message Authentication Engine 134 and the publisher system 112.

In another embodiment, a vendor party seeks to initiate a transaction with a buyer party. The buyer party has previously given permission to the Message Authentication Engine 134 account for future access of dynamically-changing content. The vendor party sends a request to the Message Authentication Engine 134 indicating requesting contact with the buyer party. The Message Authentication Engine 134 accesses a portion of the dynamically-changing content on a system (or computing device) associated with the buyer party. The Message Authentication Engine 134 forwards the retrieved portion of dynamically-changing content to the vendor party. The vendor party receives the retrieved portion of dynamically-changing content at a system (or computing device) associated with the vendor party. The vendor party directly sends a message to the buyer party—where the message includes the portion of dynamically-changing content. Therefore, upon receiving the unsolicited message, the buyer party will be assured of the message's authenticity and trustworthiness based on the presence of the portion of dynamically-changing content in the message that the Message Authentication Engine 134 retrieved from the buyer party's own system (or computing device) according to the permission granted by the buyer party.

Another embodiment is directed to the Message Authentication Engine 134 verifying authenticity of a vendor party based on dynamically-changing content from a manufacturing party. The manufacturing party is a source of an item. The item has a serial number (or any other kind of unique identifying characteristic) and the manufacturing party pairs the item's serial number to dynamically-changing content (e.g. images, text, glyphs, etc.). The manufacturing party grants to the Message Authentication Engine 134 in the publisher system 112 permission for future access of the dynamically-changing content.

A vendor party seeks to sell the item via a listing posted on the publisher system 112. The vendor party has also been granted by the manufacturing party future access to the dynamically-changing content. The Message Authentication Engine 134 receives a request from the vendor party to post a listing to sell the item on the publisher system 112. The request includes the dynamically-changing content. The Message Authentication Engine 134 accesses the dynamically-changing content at a system associated with the manufacturing party to compare the request received from the vendor party with the dynamically-changing content provided by the manufacturing party. Based on a match, the Message Authentication Engine 134 allows the vendor party's listing to sell the item on the publisher system 112.

It is understood that the dynamically-changing content is not limited to images and GPS data. According to various embodiments, the dynamically-changing content can be at least one of the following: recently updated versions of applications, recently posted social media activity (such as status updates, check-ins recent file downloads, recent file uploads, recently accessed media files (such as recently streamed songs, recently viewed videos).

Exemplary Computer Systems

Figure 6:
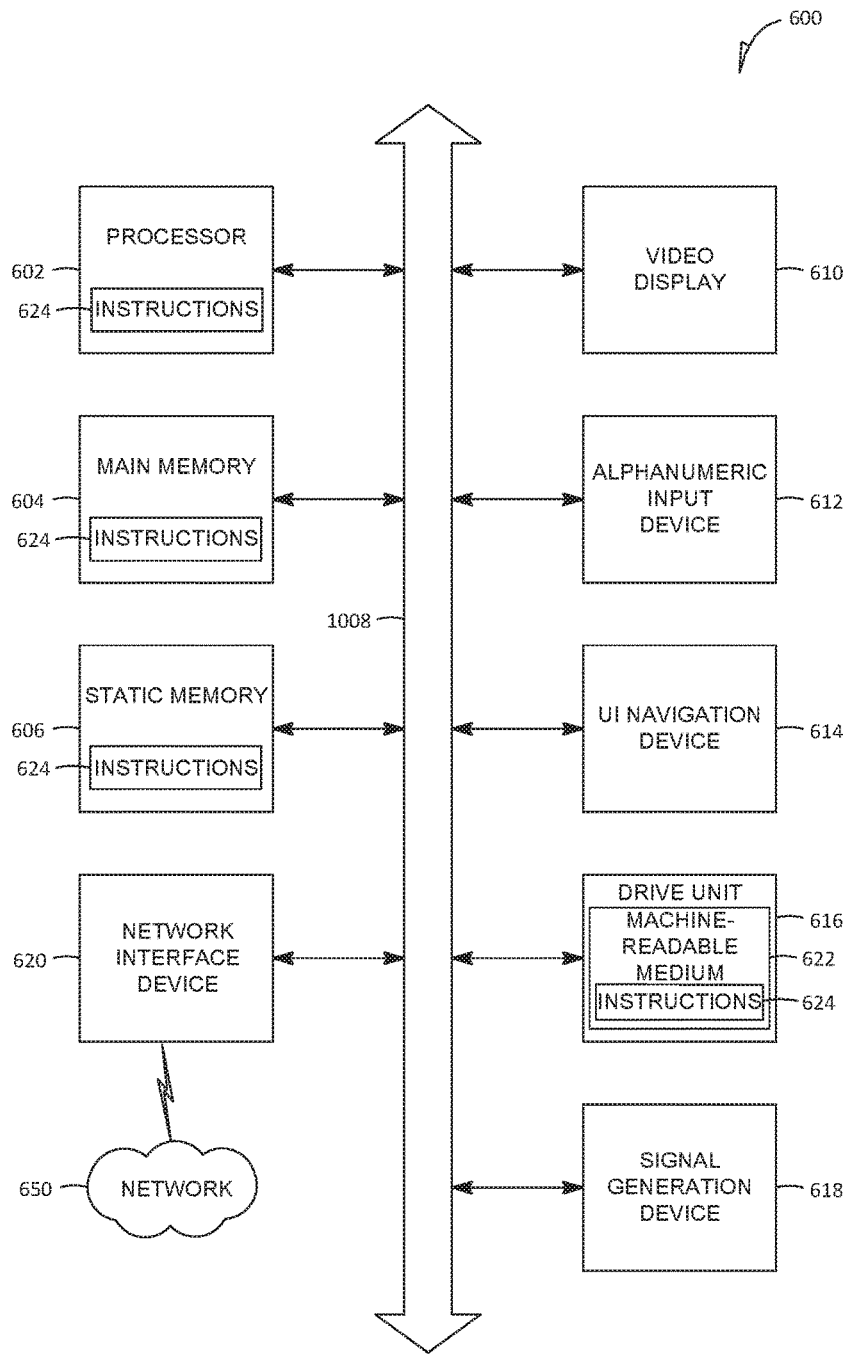
FIG. 6 shows a diagrammatic representation of machine in the example form of a computer system within which a set of instructions may be executed causing the machine to perform any one or more of the methodologies discussed herein.

FIG. 6 shows a diagrammatic representation of machine in the example form of a computer system 1000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 508. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622. on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The tern) "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in example embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Furthermore, the following claims are hereby incorporated into the Detailed Description, with each claim standing on its own as a separate embodiment.

What is claimed is:

1. A computer system comprising:
   a processor;
   a memory device holding an instruction set executable on the processor to cause the computer system to perform operations comprising:
   receiving permission for the computer system to access dynamically-changing content available on a client device corresponding to a first account, the dynamically-changing content including an image stream;
   receiving a request from the first account that corresponds to the client device for a transaction with a second account that corresponds to a transaction system distinct from the computer system and the client device, the transaction system lacking the permission received by the computer system;
   based on the request and the received permission, retrieving a portion of the dynamically-changing content to the computer system from the client device corresponding to the first account, the retrieving of the portion including retrieval of an image selected from multiple images in the image stream; and
   sending the portion of the dynamically-changing content to the transaction system that corresponds to the second account and that lacks the permission to access the dynamically-changing content, the portion of the dynamically-changing content including the retrieved image, the portion of the dynamically-changing content causing the transaction system to include the portion in a message related to the transaction sent from the second account addressed to the first account as verification of authenticity of the second account.

2. The computer system of claim 1, wherein the receiving of the permission comprises:
   receiving the permission according to a recency criteria selected by the first account, the recency criteria specifying a threshold time range during which the dynamically-changing content was created.

3. The computer system of claim 2, wherein the retrieving of the portion of the dynamically-changing content from the client device corresponding to the first account comprises:
   retrieving the portion of the dynamically-changing content based on the recency criteria.

4. The computer system of claim 1, wherein the retrieving of the portion of the dynamically-changing content from the client device corresponding to the first account comprises:
   selecting the portion of the dynamically-changing content based on the portion being created after receipt of the permission to access the dynamically-changing content.

5. The computer system of claim 1, wherein the dynamically-changing content comprises:
   an indication of a current location of the client device corresponding to the first account.

6. The computer system of claim 1 wherein the operations further comprise:
   receiving the message from the second account; and
   forwarding the message to the first account.

7. A computer-implemented method, comprising:
   receiving permission for a computer system to access dynamically-changing content available on a client device corresponding to a first account, the dynamically-changing content including an image stream;
   receiving a request from the first account that corresponds to the client device for a transaction with a second account that corresponds to a transaction system distinct from the computer system and the client device, the transaction system lacking the permission received by the computer system;
   based on the request and the received permission, via one or more processors, retrieving a portion of the dynamically-changing content to the computer system from the client device corresponding to the first account, the retrieving of the portion including retrieval of an image selected from multiple images in the image stream; and
   sending the portion of the dynamically-changing content to the transaction system that corresponds to the second account and that lacks the permission to access the dynamically-changing content, the portion of the dynamically-changing content including the retrieved image, the portion of the dynamically-changing content causing the transaction system to include the portion in a message related to the transaction sent from the second account addressed to the first account as verification of authenticity of the second account.

8. The computer-implemented method of claim 7, wherein the receiving of the permission comprises:
   receiving the permission according to a recency criteria selected by the first account, the recency criteria specifying a threshold time range during which the dynamically-changing content was created.

9. The computer-implemented method of claim 8, wherein the retrieving of the portion of the dynamically-changing content comprises:
   retrieving the portion of the dynamically-changing content based on the recency criteria.

10. The computer-implemented method of claim 7, wherein the retrieving of the portion of the dynamically-changing content comprises:
    selecting the portion of the dynamically-changing content based on the portion being created after receipt of the permission to access the dynamically-changing content.

11. The computer-implemented method of claim 7, wherein the dynamically-changing content comprises:
    an indication of a current location of the client device corresponding to the first account.

12. A non-transitory computer-readable medium storing executable instructions thereon, which, when executed by a processor, cause the processor to perform operations including:
    receiving permission for a computer system to access dynamically-changing content available on a client device corresponding to a first account, the dynamically-changing content including an image stream;
    receiving a request from the first account that corresponds to the client device for a transaction with a second account that corresponds to a transaction system distinct from the computer system and the client device, the transaction system lacking the permission received by the computer system;

based on the request and the received permission, retrieving a portion of the dynamically-changing content to the computer system from the client device corresponding to the first account, the retrieving of the portion including retrieval of an image selected from multiple images in the image stream; and sending the portion of the dynamically-changing content to the transaction system that corresponds to the second account and that lacks the permission to access the dynamically-changing content, the portion of the dynamically-changing content including the retrieved image, the portion of the dynamically-changing content causing the transaction system to include the portion in a message related to the transaction sent from the second account addressed to the first account as verification of authenticity of the second account.

13. The non-transitory computer-readable medium of claim 12, wherein the receiving of the permission comprises:

receiving the permission according to a recency criteria selected by the first account, the recency criteria specifying a threshold time range during which the dynamically-changing content was created.

14. The non-transitory computer-readable medium of claim 13, wherein the retrieving of the portion of the dynamically-changing content comprises:

retrieving the portion of the dynamically-changing content based on the recency criteria.

15. The non-transitory computer-readable medium of claim 12, wherein the retrieving of the portion of the dynamically-changing content comprises:

selecting the portion of the dynamically-changing content created after receipt of the permission to access the dynamically-changing content.

16. The non-transitory computer-readable medium of claim 12, wherein the dynamically-changing content comprises:

an indication of a current location of the client device corresponding to the first account.

17. The non-transitory computer-readable medium of claim 12, wherein the operations further comprise:

receiving the message from the second account; and
forwarding the message to the first account.

* * * * *